(12) United States Patent
Astrom et al.

(10) Patent No.: US 8,975,915 B2
(45) Date of Patent: Mar. 10, 2015

(54) DRIVER CIRCUIT FOR A DIGITAL SIGNAL TRANSMITTING BUS

(71) Applicant: Infineon Technologies AG, Neubiberg (DE)

(72) Inventors: David Astrom, Feffernitz (AT); Daniel Mandler, Irschen (AT)

(73) Assignee: Infineon Technologies AG, Neubiberg (DE)

( * ) Notice: Subject to any disclaimer, the term of this patent is extended or adjusted under 35 U.S.C. 154(b) by 215 days.

(21) Appl. No.: 13/631,925

(22) Filed: Sep. 29, 2012

(65) Prior Publication Data

US 2014/0091833 A1 Apr. 3, 2014

(51) Int. Cl.
*H03K 19/003* (2006.01)

(52) U.S. Cl.
USPC .............................. 326/34; 326/86; 327/109

(58) Field of Classification Search
USPC .............................. 326/30–34, 82–83, 86–87; 327/108–109, 170
See application file for complete search history.

(56) References Cited

U.S. PATENT DOCUMENTS

| 8,001,453 | B2 * | 8/2011 | Uemura et al. | 714/799 |
| 8,487,655 | B1 * | 7/2013 | Kutz et al. | 326/86 |
| 2006/0152261 | A1 * | 7/2006 | Lance | 327/170 |
| 2009/0243655 | A1 * | 10/2009 | Nascimento et al. | 326/83 |

* cited by examiner

*Primary Examiner* — Jason M Crawford
(74) *Attorney, Agent, or Firm* — Slater & Matsil, L.L.P.

(57) ABSTRACT

A driver circuit for a digital signal transmitting bus includes a main switch. The main switch is connected to the bus, is controllable by the digital signal to be transmitted, and has one on-switching state in which it has maximum electrical conductivity, one off-switching state in which it has minimum electrical conductivity and at least one intermediate switching state with an electrical conductivity between the minimum and maximum conductivity. The digital signal has a first logic state and a second logic state, the first logic state controls the main switch to be in the on-switching state and the second logic state controls the main switch to be in the off-switching state. The main switch is in the intermediate switching state during switching from the on-switching state to the off-switching state and/or vice versa.

18 Claims, 11 Drawing Sheets

DRIVER CIRCUIT FOR A DIGITAL SIGNAL TRANSMITTING BUS

TECHNICAL FIELD

The present disclosure relates to a driver circuit for a digital transmitting bus, in particular to a driver circuit for reducing electromagnetic emissions during switching operations of a digital signal transmitting bus.

BACKGROUND

In many applications within different fields, for example in the automotive or industrial field, electronic control units (ECUs) are used to implement many different functions. Different ECUs inside one application often need to exchange data. In addition to communication within an on-board system, communication with external components is also required for many applications.

In order to communicate, the ECUs should be interconnected. In this way they form networks. Within these networks, mainly serial bus systems are used for communication. Different serial bus systems are known today, such as CAN (Controller Area Network), LIN (Local Interconnect Network), FlexRay or MOST (Media Oriented Systems Transport).

The ECUs that communicate over the bus system generally include a transceiver for sending and receiving of data. Switching operations performed within the transceivers, however, can cause electromagnetic emissions. Such disturbing influences should be kept as low as possible, as they may induce unwanted effects in applications, especially in automotive applications which generally include highly integrated modules.

It is known to damp these emissions with the use of inductors. Often, in this context, such inductors are referred to as chokes or common mode chokes. These inductors, however, need to have a certain inductance, and therefore size, to achieve the desired filter effect. This makes the inductors too big to integrate them into the transceivers. They therefore need to be provided as external components, which results in additional costs for the ECU manufacturers.

Therefore, a solution is needed, which reduces the electromagnetic emissions within bus networks at reduced costs.

SUMMARY OF THE INVENTION

A driver circuit is disclosed. In accordance with one example of the present invention, the driver circuit comprises a main switch. The main switch is connected to the bus, it is controllable by the digital signal to be transmitted and has one on-switching state in which it has maximum electrical conductivity, one off-switching state in which it has minimum electrical conductivity and at least one intermediate switching state with an electrical conductivity between the minimum and maximum conductivity. The digital signal has a first logic state and a second logic state. The first logic state controls the main switch to be in the on-switching state and the second logic state controls the main switch to be in the off switching state. The main switch is in the at least one intermediate switching state during switching from the on-switching state to the off-switching state and/or vice versa.

These and other aspects will be better understood with help of the attached drawings and the following detailed description.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further objects and advantages thereof, may best be understood with reference to the following description, taken in connection with the accompanying drawings, in which:

DETAILED DESCRIPTION OF ILLUSTRATIVE EMBODIMENTS

In the following detailed description, reference is made to the accompanying drawings, which form a part thereof, and in which is shown by way of illustration specific embodiments in which the invention may be practiced. In this regard, directional terminology, such as "top," "bottom," "front," "back," "leading," "trailing" etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
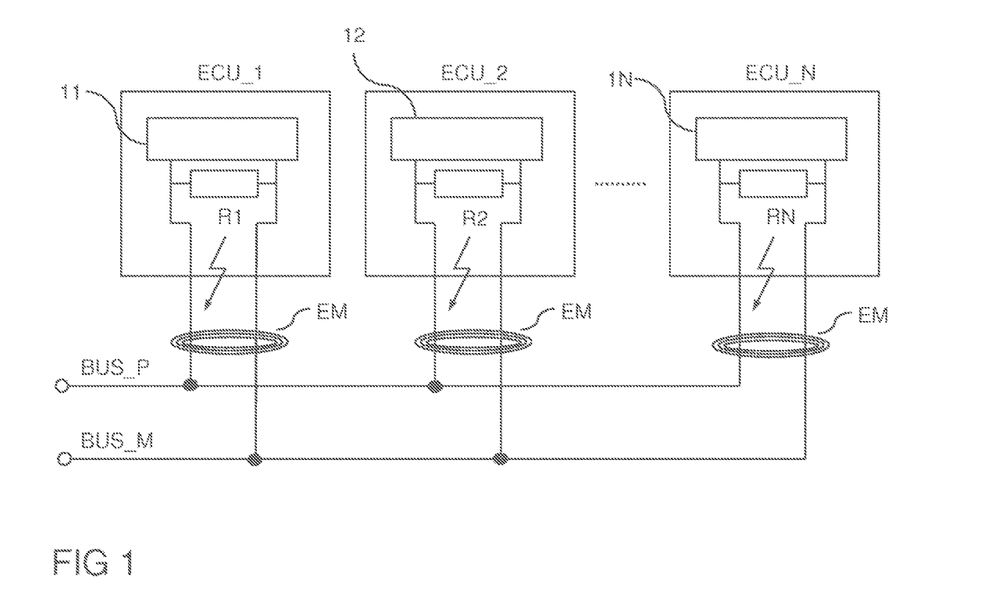
FIG. 1 is a circuit diagram of a bus system with two bus lines and several ECUs with electromagnetic emissions.

FIG. 1 shows a bus system with a first and second bus line BUS_P, BUS_M. Several ECUs ECU_1, ECU_2, ECU_n are connected to the two bus lines BUS_P, BUS_M. The number N of ECUs connected to the bus lines depends on the application. The maximum possible number N of ECUs connected to the bus lines generally depends on the kind of bus that is used. For example, the number N of possible ECUs connected to CAN (Controller Area Network) bus is 32. Each ECU includes a transceiver 11, 12, 1N. Each transceiver 11, 12, 1N is coupled to the first bus line BUS_P with a first stub and is coupled to the second bus line BUS_M with a second stub. In some bus systems some ECUs are only connected to one bus line. The transceiver 11, 12, 1N sends and receives data via the bus lines BUS_P, BUS_M.

In order to avoid signal reflection on the lines, a resistor R1, R2, RN is coupled in parallel to each transceiver 11, 12, 1N. In known bus systems, data is transmitted by changing the voltage levels on the bus lines BUS_P, BUS_M. For this reason, the transceivers 11, 12, 1N perform switching operations on the bus lines BUS_P, BUS_M. These switching operations within the transceivers 11, 12, 1N, however, cause electromagnetic emissions which are indicated in FIG. 1 and are referred to as EM.

Figure 2:
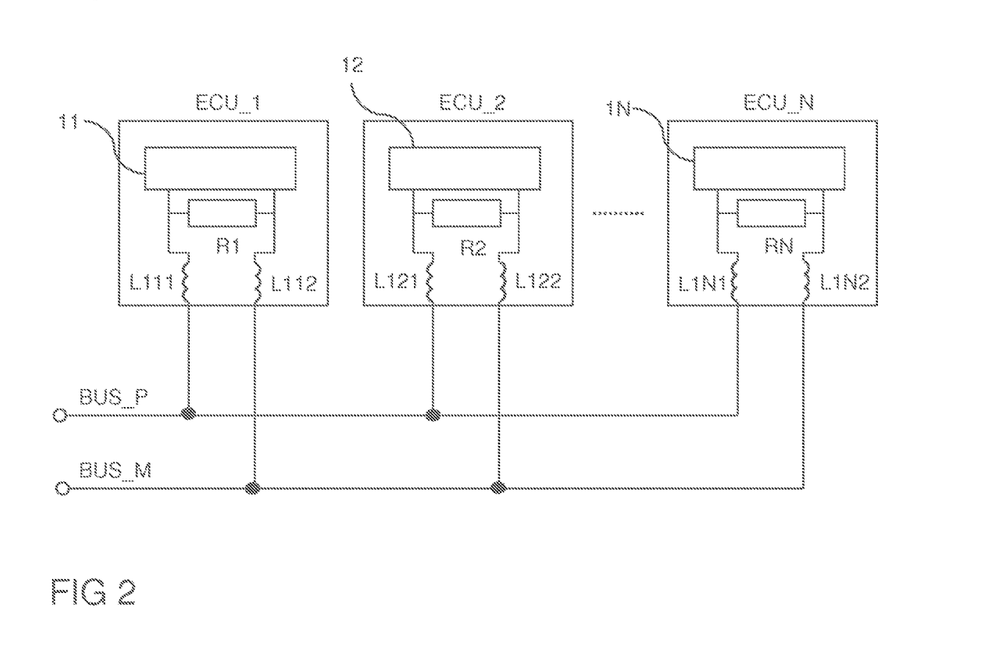
FIG. 2 is a circuit diagram of a bus system with two bus lines and several ECUs with reduced electromagnetic emissions.

In order to reduce such electromagnetic emissions, inductors L111, L112, L121, L122, L1N1, L1N2 may be inserted between each bus line BUS_P, BUS_M and the transceivers 11, 12, 1N, as is shown in FIG. 2. In order to effectively reduce the electromagnetic emissions, however, the inductors L111, L112, L121, L122, L1N1, L1N2 need to have a certain inductance. For this reason, inductors L111, L112, L121, L122, L1N1, L1N2 are rather large and are, therefore, expensive. Thus, it is desirable to provide a bus with no inductors L111, L112, L121, L122, L1N1, L1N2.

Figure 3:
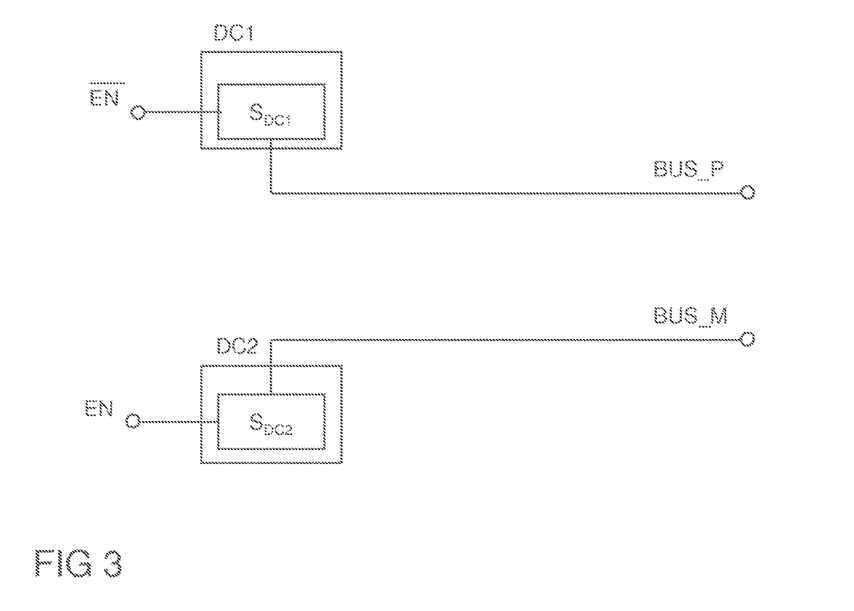
FIG. 3 is a circuit diagram of a bus system with two bus lines and a driver circuit coupled to each bus line.

FIG. 3 shows the basic principle of a bus system, having driver circuits DC1, DC2 coupled to the bus lines BUS_P, BUS_M. A first driver circuit DC1 is coupled to the first bus line BUS_P and a second driver circuit DC2 is coupled to the second bus line BUS_M. The driver circuits DC1, DC2 may be part of a transceiver 11, 12, 1N. Each driver circuit DC1, DC2 includes a main switch $S_{DC1}$, $S_{DC2}$. The main switch $S_{DC2}$ is controllable by a signal EN to be transmitted, the main switch $S_{DC1}$ is controllable by the negated signal $\overline{EN}$ to be transmitted. The signal EN to be transmitted generally is a digital signal. Therefore, it comprises two states occurring on each line BUS_P, BUS_M. The main switches $S_{DC1}$, $S_{DC2}$ may couple a bus line BUS_P, BUS_M to a power source or to a reference potential, for example (not shown in FIG. 3).

Each main switch $S_{DC1}$, $S_{DC2}$ can be in a first switching state, having a minimum electrical conductivity, and a second switching state, having a maximum electrical conductivity. The first switching state may represent an off-state, the second switching state may represent an on-state. If the main switches $S_{DC1}$, $S_{DC2}$ were switched fast (=hard) between off- and on-states, this would result in steep slopes and square edges of the signal. This would heavily increase the power spectrum, which is an unwanted effect. Therefore, the main switches $S_{DC1}$, $S_{DC2}$ have more than only two switching states. In addition to the first and second switching state, the main switches $S_{DC1}$, $S_{DC2}$ have at least one intermediate switching state with an electrical conductivity between the minimum and the maximum conductivity. Each of the intermediate switching states has an electrical conductivity between the minimum and the maximum conductivity, different from the other intermediate switching states. By successively increasing the electrical conductivity of the main switches $S_{DC1}$, $S_{DC2}$ when switching from the off-state to the on-state, or successively decreasing the electrical conductivity of the main switches $S_{DC1}$, $S_{DC2}$ when switching from the on-state to the off-state, the power spectrum can be substantially decreased.

Figure 4:
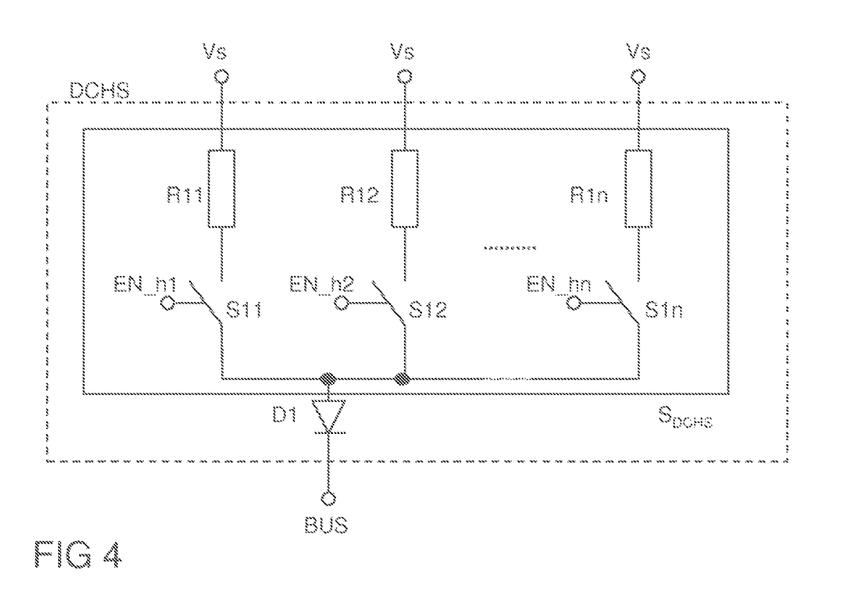
FIG. 4 is a circuit diagram of a high side driver circuit for a bus system.

FIG. 4 shows an exemplary implementation of a driver circuit DC1, DC2. In this example, the driver circuit DCHS is used as a high side driver circuit and is, therefore, coupled between a bus line BUS and a power source Vs. The high side driver circuit DCHS includes a main switch $S_{DCHS}$ and a reverse protection diode D1 coupled in series. The main switch $S_{DCHS}$ further includes n sub-switches S11, S12, S1N coupled in parallel. A resistor R11, R12, R1N is coupled in series to each sub-switch S11, S12, S1N. The sub-switches S11, S12, S1N are controllable by the signals EN_h1, EN_h2, EN_hn. The signals EN_h1, EN_h2, EN_hn depend on the signal EN to be transmitted. In the off-state of the main switch $S_{DCHS}$, all sub-switches S11, S12, S1N may be open so that the main switch $S_{DCHS}$ has minimum conductivity. In the on-state of the main switch $S_{DCHS}$, all sub-switches S11, S12, S1N may be closed so that the main switch $S_{DCHS}$ has maximum conductivity. When switching the bus line BUS from the off-state to the on-state or vice versa, the sub-switches S11, S12, S1N are closed or opened successively, with a certain time delay between each opening or closing and the number of closed or opened switches increasing for each intermediate switching state. In this way, the resistors R11, R12, R1N are connected or disconnected successively, thereby successively increasing or decreasing the electrical conductivity by decreasing or increasing the total resistance of the main switch $S_{DCHS}$.

However, it is also possible, for example, that one or more sub-switches S11, S12, S1N are closed in the off-state of the main switch $S_{DCHS}$, thereby connecting a resistor R11, R12, R1N with high resistance, the main switch $S_{DCHS}$ thus having minimum conductivity. At least one sub-switch S11, S12, S1N may be closed in the on-state of the main switch $S_{DCHS}$, thereby connecting a resistor R11, R12, R1N with low resistance, the main switch $S_{DCHS}$ thus having maximum conductivity. With each intermediate switching state, different switches may be closed, connecting different resistors R11, R12, R1N with increasing or decreasing resistance, thereby successively increasing or decreasing the electrical conductivity by decreasing or increasing the total resistance of the main switch $S_{DCHS}$.

Figure 5:
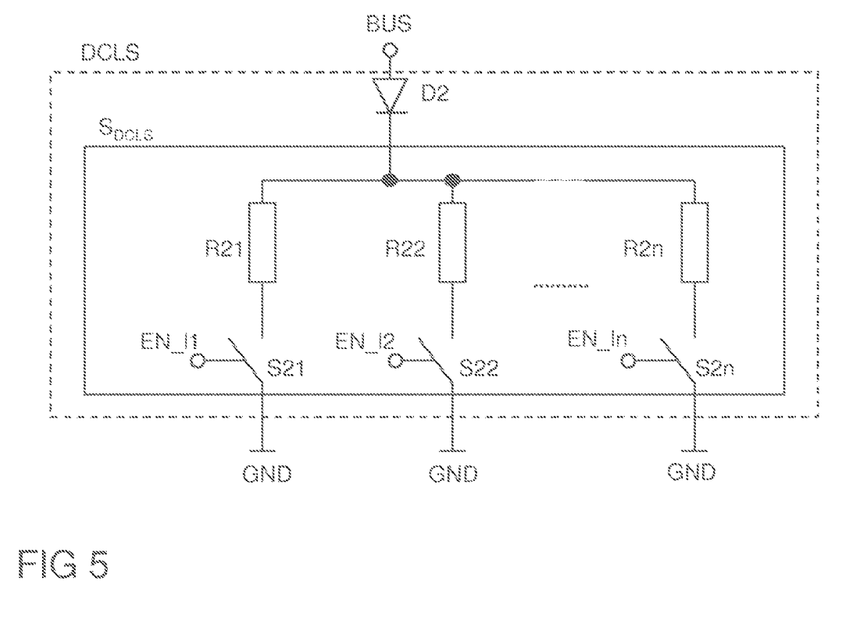
FIG. 5 is a circuit diagram of a low side driver circuit for a bus system.

FIG. 5 shows an exemplary driver circuit DCLS which is similar to the high side driver circuit DCHS and which is used as a low side driver circuit instead of a high side driver circuit, the low side driver circuit DCLS being coupled between the bus line BUS and a reference potential GND. The sub-switches S21, S22, S2N are controllable by the signals EN_11, EN_12, EN_1n that also depend on the digital signal EN to be transmitted. When a high side driver circuit DCHS and a low side driver circuit DCLS are used in the same bus system, the signals EN_h1, EN_h2, EN_hn and EN_11, EN_12, EN_1n may be synchronous.

Figure 6:
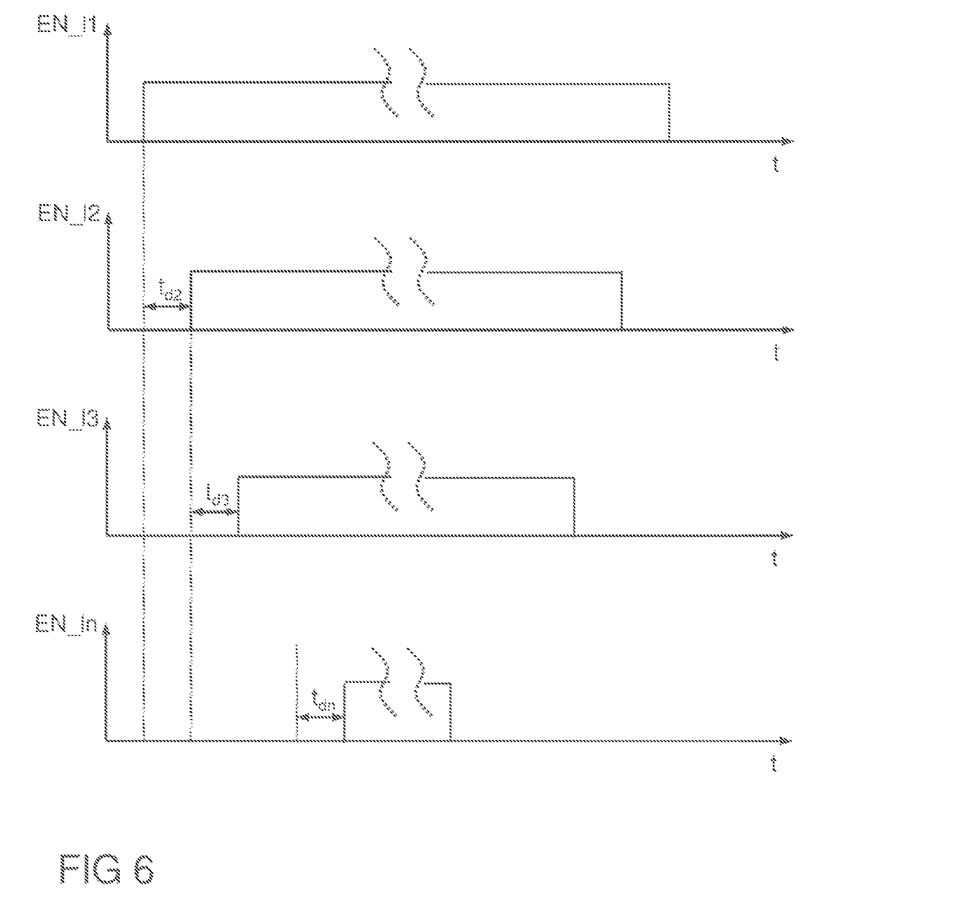
FIG. 6 illustrates an example of control signals for controlling a driver circuit for a bus system.

In order to connect the resistors R11, R12, R1N or R21, R22, R2N one by one and, therefore, successively increase the electrical conductivity of the switch DCHS or DCLS, the control signals EN_h1, EN_h2, EN_hn and EN_11, EN_12, EN_1n have a certain time delay with respect to each other. The same applies for disconnecting the resistors. The control signals EN_11, EN_12, EN_1n for controlling the switches in a low side driver circuit DCLS are exemplarily shown in FIG. 6. The first signal EN_11 for switching the first sub-switch S21 is applied to the sub-switch S21 without a time delay. The second signal EN_12 for switching the second sub-switch S22 is applied to the sub-switch S22 with a certain time delay $t_{d2}$ with respect to the first signal EN_11. A third signal for switching a third sub-switch S23 (not shown in FIG. 5) is applied to the third sub-switch S23 with a time delay $t_{d3}$ with respect to the second signal EN_12. An n-th signal EN-1n switches the n-th sub-switch S2n, being delayed a certain time $t_{dn}$ with respect to a preceding signal. The number of signals depends on the number of sub-switches that are included in the main switch $S_{DCLS}$. The signals within a high side driver circuit DCHS are provided in the same manner with a certain time delay between each signal. To avoid spectral energy at the same frequency, the time delays $t_{d1}, t_{d2}, \ldots t_{dn}$ may be chosen not to be uniform, but to differ from each other.

Figure 7:
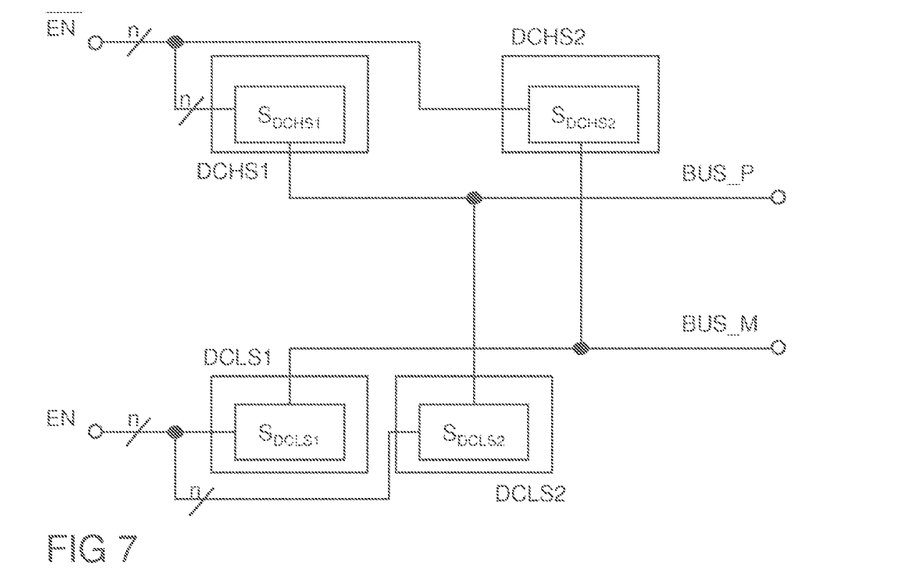
FIG. 7 is a circuit diagram of a bus system with two bus lines and driver circuits coupled to each bus line.

FIG. 7 shows an example of a bus system with two bus lines BUS_P, BUS_M. Each bus line BUS_P, BUS_M has a high side driver circuit DCHS and a low side driver circuit DCLS connected to it. By this, each bus line BUS_P, BUS_M can be connected to a power source Vs and to a reference potential GND (not shown), for example, by switching, i.e., activating, the corresponding driver circuit DCHS1, DCHS2, DCLS1, DCLS2. The high side driver circuits DCHS1, DCHS2 are controllable by the inverted control signal $\overline{EN}$ to be transmitted and the low side driver circuits DCLS1, DCLS2 are controllable by the control signal EN to be transmitted. As the control signal EN to be transmitted is provided with a time-delay for each switching state, the control signal EN is transmitted via n separate lines that are coupled to the sub-switches S21, S22, S2N (not shown in FIG. 7) to be closed or opened and the inverted control signal $\overline{EN}$ is transmitted via n separate lines that are coupled to the sub-switches S11, S12, S1N (not shown in FIG. 7) to be closed or opened.

Compared to the exemplary circuit shown in FIG. 3, an additional driver circuit DCHS2, DCLS2 is coupled to each bus line BUS_P, BUS_M in FIG. 7. This may be done, for example, in order to achieve an even greater robustness against unwanted electromagnetic irradiation. On the other hand, the impedances of the high side DCHS1, DCHS2 and low side driver circuits DCLS1, DCLS2 in the off-state are adapted to each other in this way. By this, an impedance matching is achieved over the full voltage range. The additional driver circuits DCHS2, DCLS2 may have a higher series resistance than the first driver circuits DCHS1, DCLS1, in order not to interfere with the function of the system because of their conductivity. The driver circuits DCLS2, DCHS2 may each be controlled by one or more control signals EN.

Figure 8:
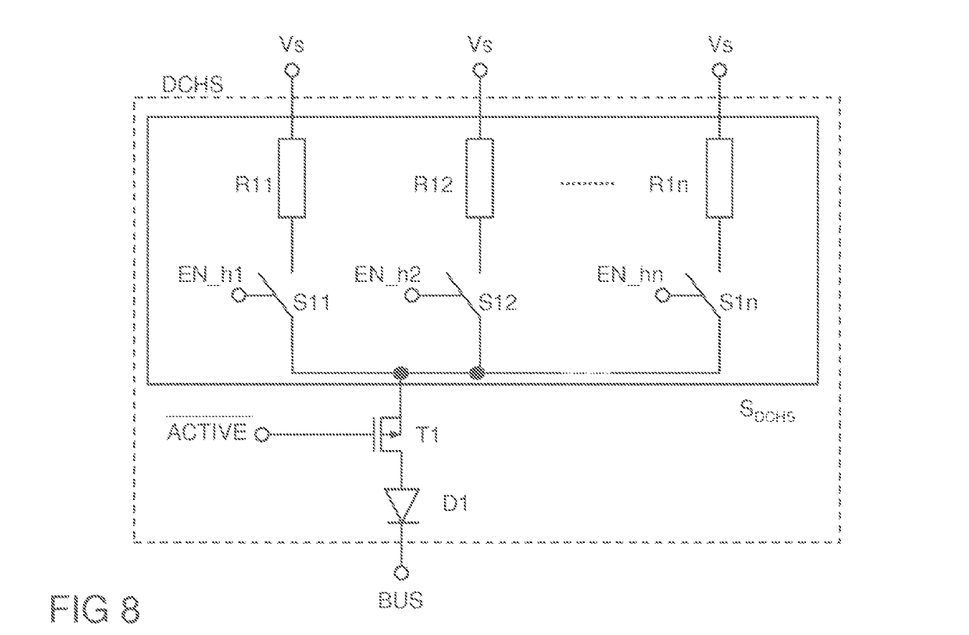
FIG. 8 is another circuit diagram of a high side driver circuit for a bus system.

FIG. 8 shows the driver circuit of FIG. 4, but with an additional transistor T1 coupled between the diode D1 and the main switch $S_{DCHS}$. The sub-switches S11, S12, S1N may, for example, be implemented using low voltage transistors while the additional transistor T1 may, for example, be implemented using a high voltage transistor. In this way, the transistor T1 protects the sub-switches S11, S12, S1N. By using only one high voltage transistor T1, less space is required, compared to a circuit in which each sub-switch S11, S12, S1N itself is implemented as a high voltage transistor. The additional transistor T1 is controllable by an inverted control signal $\overline{ACTIVE}$, the transistor T1 being in a conductive or nonconductive state according to the state of the control signal $\overline{ACTIVE}$. The additional transistor T1 and the diode D1 may be interchanged, if a technology is used in which the diode D1 cannot be implemented without unwanted parasitics.

Figure 9:
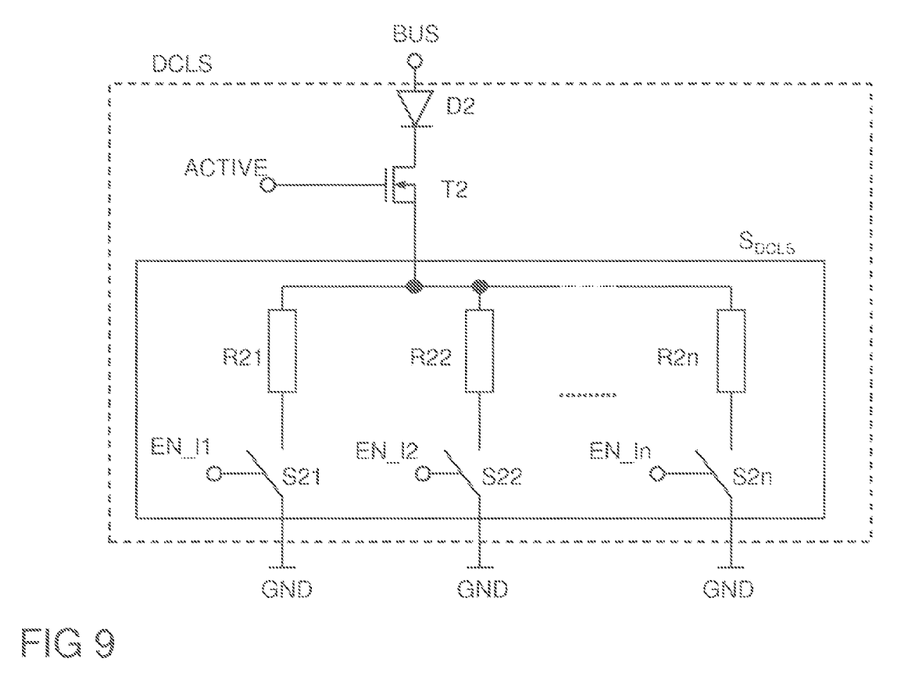
FIG. 9 is another circuit diagram of a low side driver circuit for a bus system.

FIG. 9 shows the same driver circuit DCLS as in FIG. 5 with an additional transistor T2 coupled between the diode D2 and the main switch $S_{DCHS}$. As described above, the additional transistor T2 may be implemented using a high voltage transistor, whereas sub-switches S21, S22, S2N may be implemented using low voltage transistors. The additional transistor T2 is controllable by a control signal ACTIVE, the transistor T2 being in a conductive or nonconductive state according to the state of the control signal ACTIVE.

Figure 10:
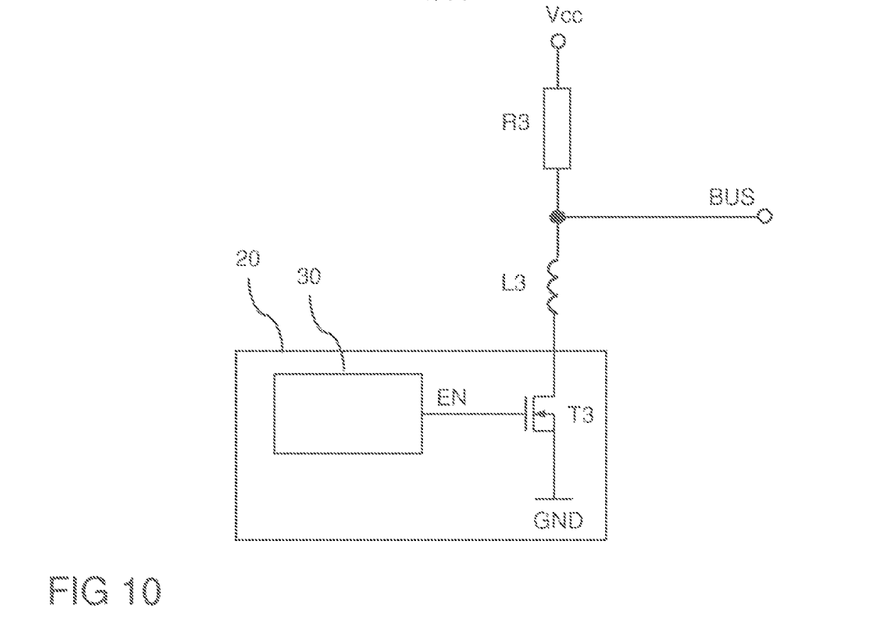
FIG. 10 is a circuit diagram of a LIN bus system.

FIG. 10 shows an example of a signal transmitting bus with only one bus line BUS. Such a bus may be a LIN (Local Interconnect Network) bus, or any other suitable bus. In a LIN bus, the bus line BUS used for transmission of signals generally is a simple unshielded single-wire line. The bus line BUS is coupled to a power source Vcc, which may be a battery voltage, for example, via a termination resistor R3. A transistor T3 is coupled between the bus line BUS and a reference potential GND. This transistor T3 is part of a transmitter 20, used for transmission of signals on the bus line. The transmitter 20 further includes a controller 30, that is coupled to the transistor T3.

A LIN bus operates with two complementary logic levels. A dominant level with a voltage close to reference potential GND represents a logical '0.' A recessive level with an electrical voltage close to the battery voltage Vcc represents a logical '1.' The LIN physical layer specification requires that the transceiver switching does not interfere with the performance of other electronic components. Designers have to make sure that the transceiver meets the EMC (Electromagnetic Compatibility) requirements of, for example, automobile makers. With a recessive state, the transmitter 20 is passive and the pull up resistor R3 pulls the bus line BUS close to the supply voltage of the battery Vcc. The dominant state occurs, when the transmitter 20 actively pulls down the bus line BUS towards the reference potential GND. An inductor L3 is coupled between the bus line BUS and the transmitter 20, in order to reduce electromagnetic emissions and meet the EMC requirements.

Figure 11:
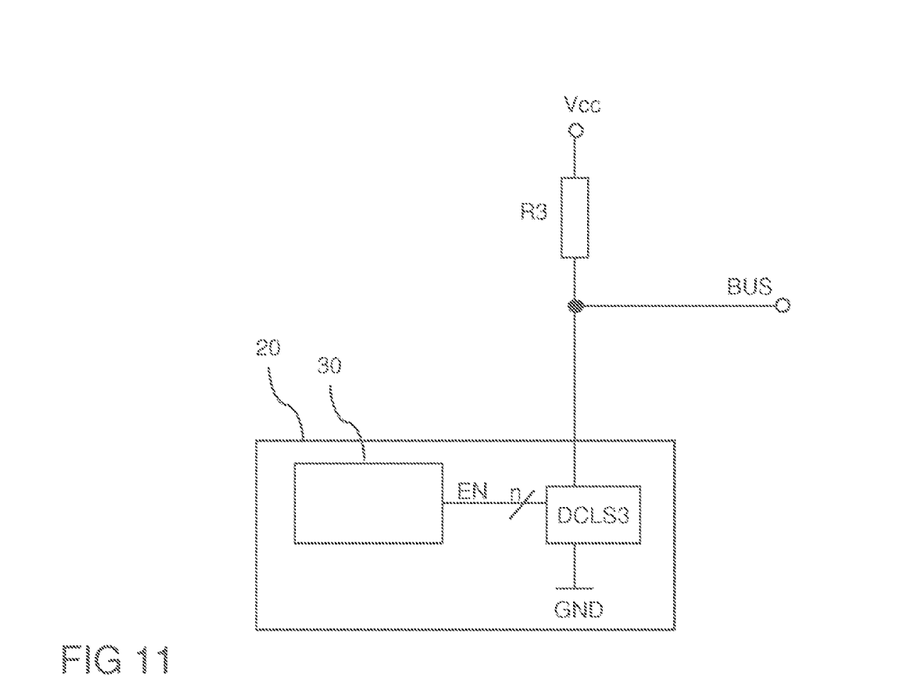
FIG. 11 is a circuit diagram of a LIN bus system including a driver circuit.

FIG. 11 shows the bus system of FIG. 10, but with a low side driver circuit DCLS3 coupled to the bus line BUS instead of transistor T3. The driver circuit DCLS3 successively increases the electrical conductivity and, therefore, decreases the power spectrum during switching from the off-state to the on-state. The driver circuit DCLS3 successively decreases the electrical conductivity and, therefore, decreases the power spectrum during switching from the on-state to the off-state. No additional inductor L3 is required, as the driver circuit DCLS3 reduces the steepness of the slopes, e.g., rounds the edges. Dependent on the number of sub-switches S21, S22, S2$n$ included in the driver circuit DCLS3, a number of n lines are provided between the controller 30 and the driver circuit DCLS3 to provide the signal EN to be transmitted with a time delay on each line.

Figure 12:
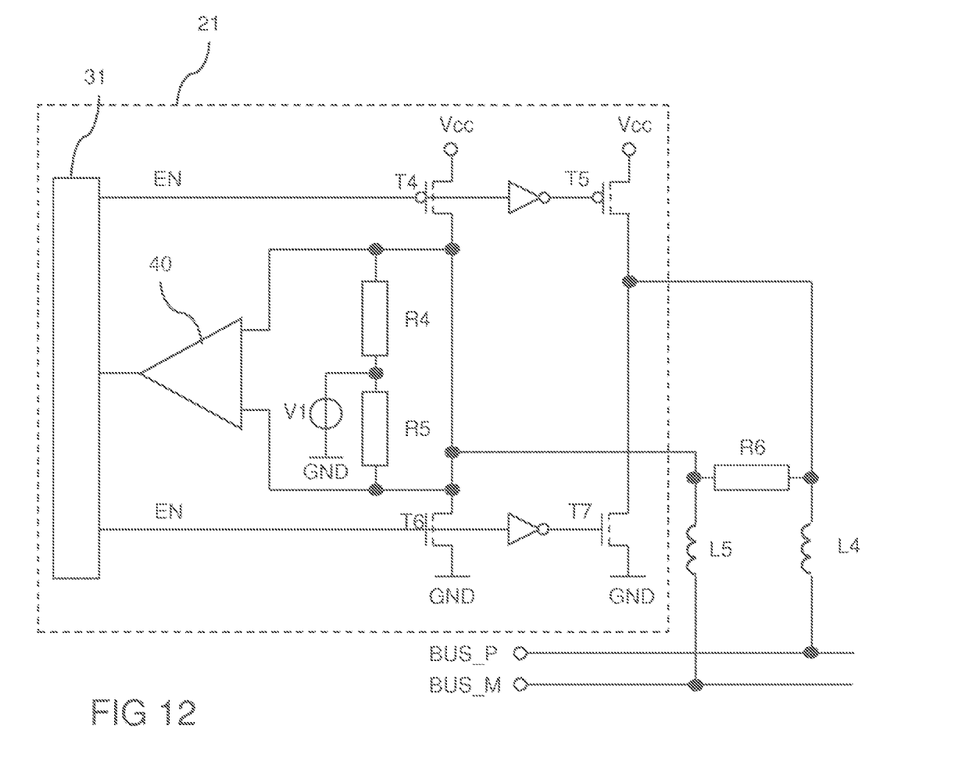
FIG. 12 is a circuit diagram of a FlexRay bus system.

FIG. 12 shows an exemplary driver circuit of a two line FlexRay communications bus. A FlexRay communications bus is a deterministic, fault-tolerant and high speed bus system. FlexRay mostly uses two twisted wires BUS_P, BUS_M to connect nodes together and to transmit signal data, but also supports single channel configurations which consist of one pair of wires. Dual channel configurations, however, offer enhanced fault tolerance and increased bandwidth. FlexRay busses require termination in the form of a resistor R6 connected between the pair of twisted wires BUS_P, BUS_M. For transmission, differential voltage levels are used. A transmit level results out of a voltage difference between the two bus lines BUS_P, BUS_M. A FlexRay bus has up to four different states.

The levels of the two bus lines BUS_P, BUS_M may be controlled with transistors T4, T5, T6, T7. The first bus line BUS_P is coupled to a battery voltage Vcc and to a reference potential GND via the transistors T5 and T7. The second bus line BUS_M is coupled to the battery voltage Vcc and to the reference potential GND via the transistors T4 and T6. Depending on the voltage levels needed on the bus lines BUS_P, BUS_M for transmission, the bus lines BUS_P, BUS_M are connected to or disconnected from the battery voltage Vcc and reference potential GND. The bus lines BUS_P, BUS_M are coupled to the battery voltage Vcc or reference potential GND when the corresponding transistor T4, T5, T6, T7 is conductive and are disconnected from the battery voltage Vcc or reference potential GND when the corresponding transistor T4, T5, T6, T7 is non-conductive. The transistors T4, T5, T6, T7 are controlled by the control signal EN that is provided by a controller 31.

An inverting Schmitt trigger 40 is used as a receiver. The hysteresis of the Schmitt trigger 40 is defined according to the switching points of the differential signal received on the bus lines BUS_P, BUS_M. The ratio between the resistors R4, R5 and the value of the reference voltage source V1 are dimensioned accordingly. An inductor L4, L5 is coupled between each bus line BUS_P, BUS_M and the transmitter 21, in order to reduce electromagnetic emissions and meet the EMC (Electromagnetic Compatibility) requirements. However, this implementation of a receiver is only one possible example. A receiver may be implemented in any other suitable way.

Figure 13:
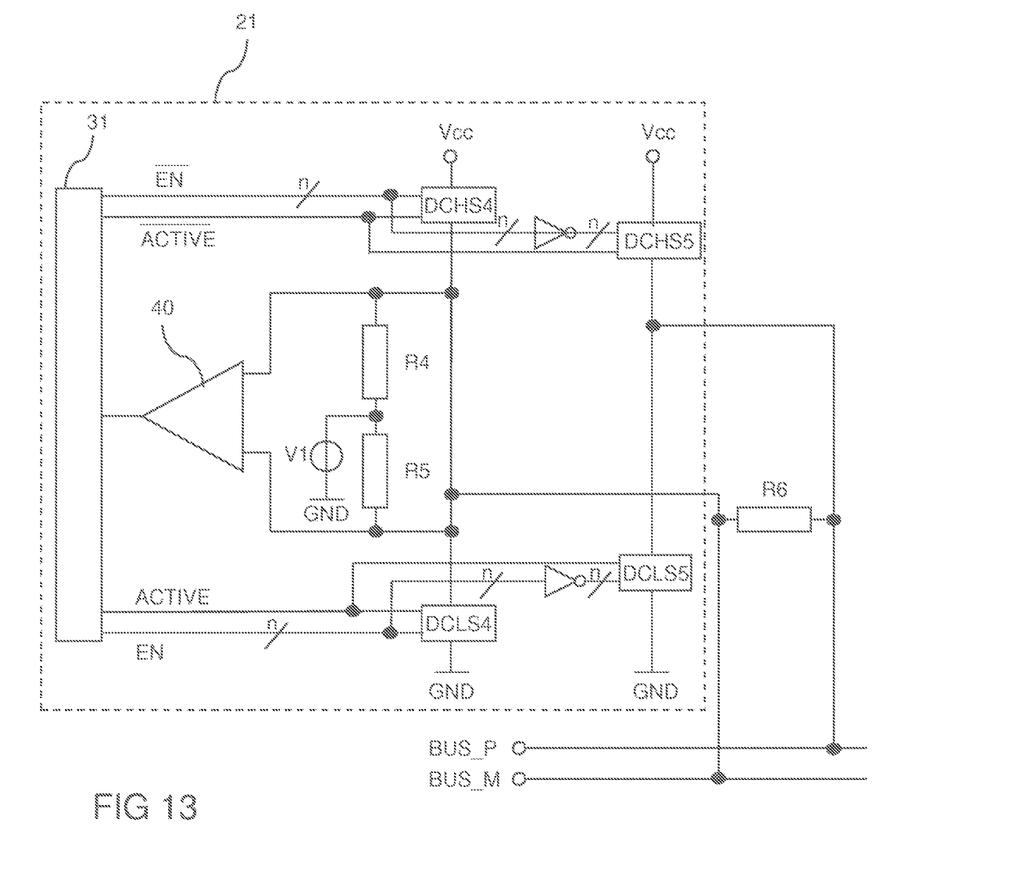
FIG. 13 is a circuit diagram of a FlexRay bus system including driver circuits.

FIG. 13 shows the FlexRay bus system of FIG. 12, wherein the transistors T4, T5, T6, T7 have been replaced by driver circuits DCHS4, DCHS5, DCLS4, DCLS5. As the driver circuits DCHS4, DCHS5, DCLS4, DCLS5 reduce the steepness of the slopes and round the edges when switching, inductors L4, L5 are not required within this configuration.

The high side driver circuits DCHS4, DCHS5 receive the negated control signal $\overline{EN}$ from the controller 31. The inverted control signal $\overline{EN}$ is provided via n channels, the number of channels being dependent on the number of switching states of the driver circuits DCHS4, DCHS5. The control signal $\overline{EN}$ provided on each channel is time delayed with respect to the preceding control signal $\overline{EN}$ on another channel. The high side driver circuits DCHS4, DCHS5 also receive the inverted control signal $\overline{ACTIVE}$ from the controller 31, which controls the high voltage transistors T1. The inverted control signal $\overline{ACTIVE}$ and the high voltage transistors T1 (not shown), however, are not required. The control signal $\overline{EN}$ that is provided to the high side driver circuit DCHS5 coupled to the first bus line BUS_P is inverted.

The low side driver circuits DCLS4, DCLS5 receive the control signal EN from the controller 31. The control signal EN is provided via n channels, the number of channels being dependent on the number of switching states of the driver circuits DCLS4, DCLS5. The control signal EN provided on each channel is delayed in time with respect to the preceding control signal EN on another channel. The low side driver circuits DCLS4, DCLS5 also receive the control signal ACTIVE from the controller 32, which controls the high voltage transistors T2. The control signal ACTIVE and the high voltage transistors T2 (not shown), however, are not required. The signal EN that is provided to the driver circuit DCLS5 coupled to the first bus line BUS_P is inverted.

Figure 14:
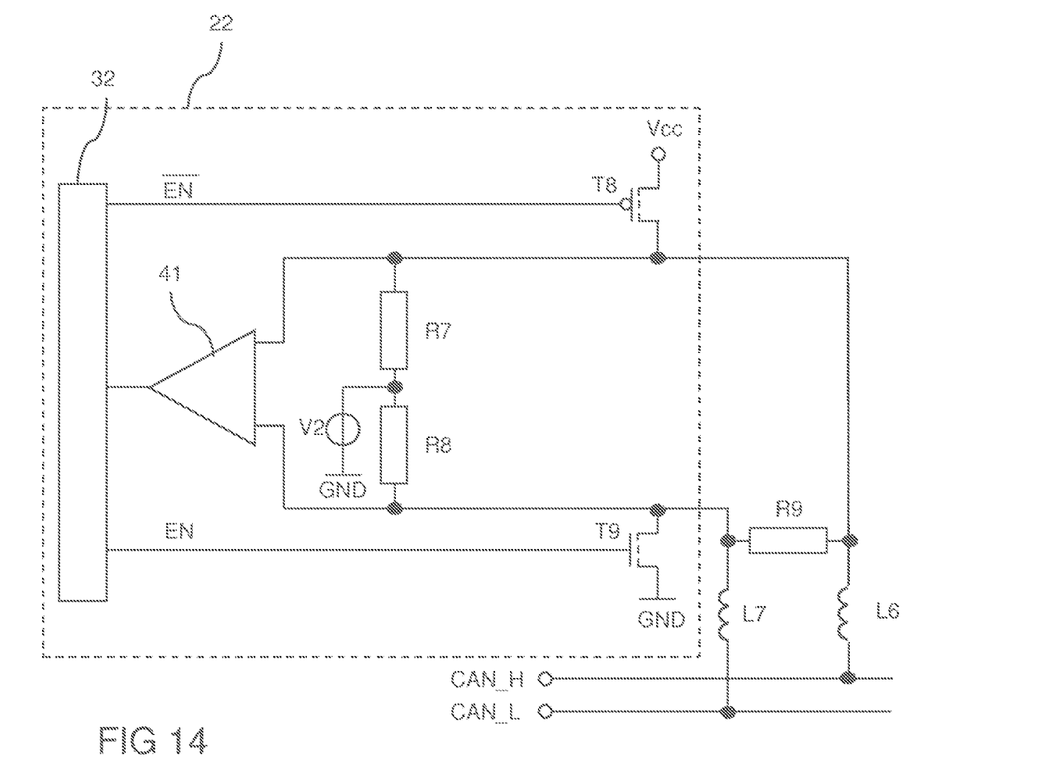
FIG. 14 is a circuit diagram of a CAN bus system.

FIG. 14 shows a CAN bus system with two bus lines CAN_H, CAN_L. A CAN bus generally has two states, a dominant and a recessive state. When data is transmitted, the receiver 41, which again is an inverted Schmitt trigger in the shown example, analyses the voltage difference between the two bus lines CAN_H, CAN_L. The hysteresis of the Schmitt trigger is again defined according to the switching points of the received differential signal. The ratio between the resistors R7, R8 and the value of the reference voltage source V2 are dimensioned accordingly. Again, this implementation of a receiver is only one possible example. A receiver may again be implemented in any other suitable way.

A termination resistor R9 is coupled between the first and second bus line CAN_H, CAN_L. The first bus line CAN_H is coupled to a battery voltage Vcc via a transistor T8. The second bus line CAN_L is coupled to a reference potential GND via a transistor T9. The transistor T8 used to connect the first bus line CAN_H to or disconnect the first bus line CAN_H from the battery voltage Vcc is controllable by the inverted control signal $\overline{EN}$ to be transmitted. The transistor T9 used to connect the second bus line CAN_L to or disconnect the second bus line CAN_L from the reference potential GND is controllable by the control signal EN. An inductor L6, L7 is coupled between each bus line CAN_H, CAN_L and the transmitter 22, in order to reduce electromagnetic emissions and meet the EMC (Electromagnetic Compatibility) requirements.

Figure 15:
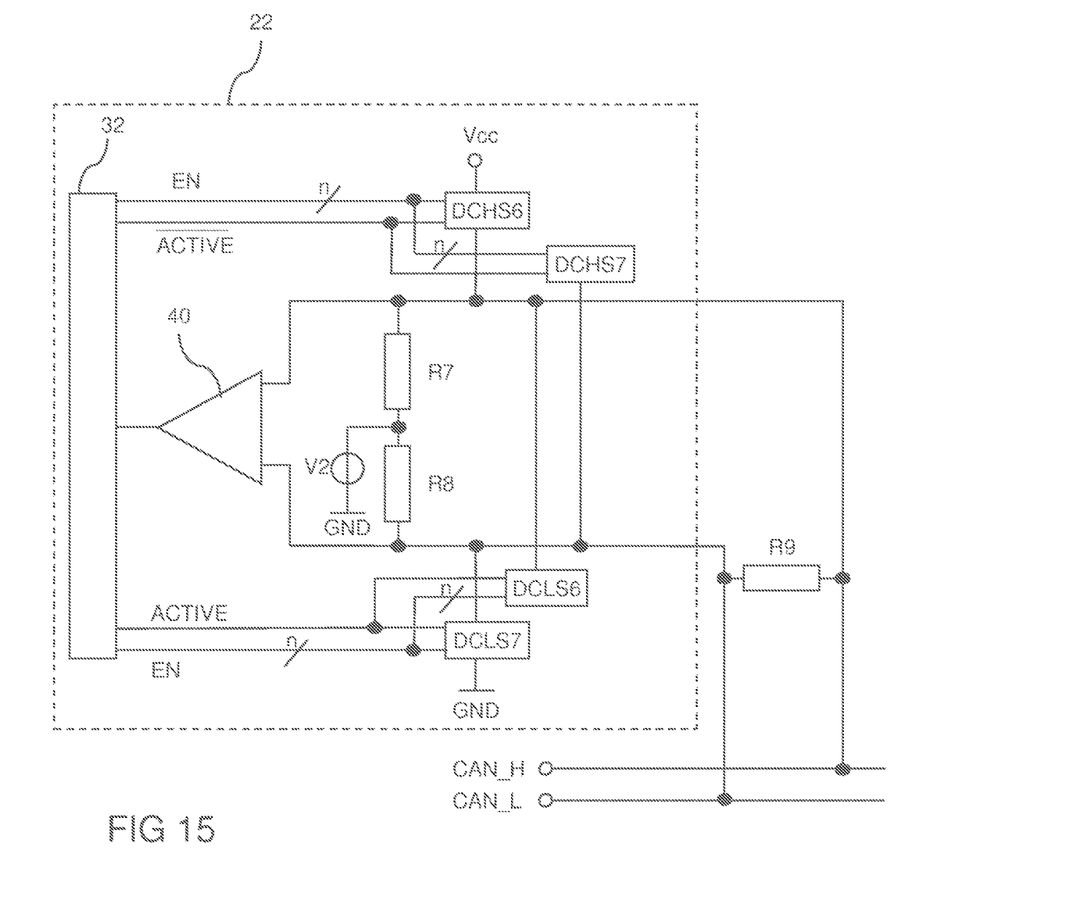
FIG. 15 is a circuit diagram of a CAN bus system driven by driver circuits.

FIG. 15 shows the CAN bus system of FIG. 14, wherein the transistors T8, T9 have been replaced by driver circuits DCHS6, DCHS7, DCLS6, DCLS7. As the driver circuits DCHS6, DCHS7, DCLS6, DCLS7 reduce the steepness of the slopes, e.g., round the edges when switching, the inductors L6, L7 are not required within this configuration.

The high side driver circuits DCHS6, DCHS7 receive the control signal EN from the controller 31. The control signal EN is provided via n channels, the number of channels being dependent on the number of switching states of high side driver circuits DCHS6, DCHS7. The control signal EN provided on each channel is delayed in time with respect to the preceding control signal EN on another channel. The high side driver circuits DCHS6, DCHS7 also receive an inverted control signal $\overline{ACTIVE}$ from the controller 32, to control the high voltage transistors T1 (not shown). The inverted control signal $\overline{ACTIVE}$ and the high voltage transistors T1, however, are not required.

The low side driver circuits DCLS6, DCLS7 also receive the control signal EN from the controller 32. The control signal EN is provided via n channels, the number of channels being dependent on the number of switching states of low side driver circuits DCLS6, DCLS7. The signal EN to be transmitted provided on each channel is delayed in time with respect to the preceding control signal EN on another channel. The low side driver circuits DCLS6, DCLS7 receive the control signal ACTIVE from the controller 32, which controls the high voltage transistors T2 (not shown). The control signal ACTIVE and the high voltage transistors T2, however, are not required.

Although present embodiments and its advantages have been described in detail, it should be understood that various changes, substitutions and alterations can be made herein without departing from the spirit and the scope of the invention as defined by the appended claims. With the above range of variations and applications in mind, it should be understood that the present invention is not limited by the foregoing description, nor is it limited by the accompanying drawings. Instead, the present invention is limited only by the following claims and their legal equivalents.

Terms such as "first," "second" and the like, are used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

What is claimed is:
1. A driver circuit for a digital signal transmitting bus comprising a main switch, wherein
the main switch is connected to the bus, is controllable by the digital signal to be transmitted, and has one on-switching state in which it has maximum electrical conductivity, one off-switching state in which it has minimum electrical conductivity and one or more intermediate switching states, each with an electrical conductivity between the minimum and maximum conductivity;

the main switch comprises a plurality of sub-switches and a plurality of resistive elements, each resistive element coupled in series with one of the sub-switches with serial connections formed of a sub-switch and a resistive element being coupled in parallel;

the digital signal has a first logic state and a second logic state, the first logic state controls the main switch to be in the on-switching state and the second logic state controls the main switch to be in the off-switching state; and the main switch is in one of the one or more intermediate switching states during switching from the on-switching state to the off-switching state and/or vice versa.

2. The driver circuit according to claim 1, wherein the one or more intermediate switching states comprise a plurality of intermediate switching states, each intermediate switching state has an electrical conductivity between the minimum and the maximum conductivity different from the other intermediate switching states.

3. The driver circuit according to claim 2, wherein the main switch passes through the intermediate switching states, successively increasing the electrical conductivity during switching from the off-switching state to the on-switching state and successively decreasing the electrical conductivity during switching from the on-switching state to the off-switching state.

4. The driver circuit according to claim 1, wherein the main switch is configured to couple the digital signal transmitting bus to a power supply or to a reference potential.

5. The driver circuit according to claim 1, wherein the sub-switches are opened or closed successively, with a time delay between each opening or closing.

6. The driver circuit according to claim 1, wherein the sub-switches coupled in parallel are controllable by the digital signal to be transmitted.

7. The driver circuit according to claim 6, wherein the digital signal to be transmitted is provided with a time delay to each of the sub-switches with respect to the other sub-switches.

8. The driver circuit according to claim 1, further comprising a diode coupled between the digital signal transmitting bus and the main switch.

9. The driver circuit according to claim 1, wherein the sub-switches are low-voltage transistors.

10. The driver circuit according to claim 9, further comprising a high-voltage transistor, coupled between the digital signal transmitting bus and the main switch.

11. The driver circuit according to claim 1, wherein the digital signal transmitting bus is a LIN bus, a CAN bus or a FlexRay bus.

12. The driver circuit according to claim 1, wherein at least one sub-switch is open when the main switch is in its off-state and wherein at least one sub-switch is closed when the main switch is in its on-state or in an intermediate switching state.

13. The driver circuit according to claim 12, wherein all of the sub-switches are open when the main switch is in its off-state and wherein all of the sub-switches are closed when the main switch is in its on-state, the number of closed sub-switches increasing with each intermediate switching state.

14. A circuit arrangement comprising:
a digital signal transmitting bus comprising a bus line;
a first driver circuit configured to couple a first bus line to a reference potential;
a second driver circuit configured to couple a second bus line to a power source; and
a driver circuit comprising a main switch, wherein
the main switch is connected to the bus, is controllable by the digital signal to be transmitted, and has one on-switching state in which it has maximum electrical conductivity, one off-switching state in which it has minimum electrical conductivity and one or more intermediate switching states, each with an electrical conductivity between the minimum and maximum conductivity;

the digital signal has a first logic state and a second logic state, the first logic state controls the main switch to be in the on-switching state and the second logic state controls the main switch to be in the off-switching state; and the main switch is in one of the one or more intermediate switching states during switching from the on switching state to the off switching state and/or vice versa.

15. The circuit arrangement according to claim 14, wherein the first driver circuit is controllable by an inverted version of the digital signal to be transmitted and the second driver circuit is controllable by the digital signal to be transmitted.

16. The circuit arrangement according to claim 15, wherein the digital signal to be transmitted and the inverted version of the digital signal to be transmitted are synchronous.

17. A method for transmitting a digital signal having a first and a second logic state on a digital signal transmitting bus, the method comprising:
connecting a main switch to the bus, the main switch being controllable by the digital signal to be transmitted and having one on-switching state in which it has maximum electrical conductivity, one off-switching state in which it has minimum electrical conductivity and one or more intermediate switching states, each with an electrical conductivity between the minimum and maximum conductivity, wherein the main switch comprises a plurality of sub-switches and a plurality of resistive elements, each resistive element coupled in series with one of the sub-switches with serial connections formed of a sub-switch and a resistive element being coupled in parallel;
controlling the main switch to be in the on-switching state by means of the first logic state of the digital signal; and
controlling the main switch to be in the off-switching state by means of the second logic state of the digital signal, the main switch being in one intermediate switching state of the one or more intermediate switching states during switching from the on-switching state to the off-switching state and/or vice versa.

18. A circuit arrangement comprising:
a digital signal transmitting bus comprising a bus line; and
a driver circuit comprising a main switch, wherein
the main switch is connected to the bus, is controllable by the digital signal to be transmitted, and has one on-switching state in which it has maximum electrical conductivity, one off-switching state in which it has minimum electrical conductivity and one or more intermediate switching states, each with an electrical conductivity between the minimum and maximum conductivity;

the main switch comprises a plurality of sub-switches and a plurality of resistive elements, each resistive element coupled in series with one of the sub-switches with serial connections formed of a sub-switch and a resistive element being coupled in parallel;

the digital signal has a first logic state and a second logic state, the first logic state controls the main switch to be in the on-switching state and the second logic state controls the main switch to be in the off-switching state; and the main switch is in one of the one or more intermediate switching states during switching from the on switching state to the off switching state and/or vice versa.

* * * * *